US012666456B2

(12) United States Patent
Zhou et al.

(10) Patent No.: US 12,666,456 B2
(45) Date of Patent: Jun. 23, 2026

(54) TECHNIQUES FOR RESELECTING SIDELINK RESOURCES IN FULL DUPLEX WIRELESS COMMUNICATIONS

(71) Applicant: QUALCOMM Incorporated, San Diego, CA (US)

(72) Inventors: Yan Zhou, San Diego, CA (US); Hemant Saggar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 467 days.

(21) Appl. No.: 18/313,211

(22) Filed: May 5, 2023

(65) Prior Publication Data

US 2024/0373450 A1     Nov. 7, 2024

(51) Int. Cl.
| | |
|---|---|
| *H04W 72/541* | (2023.01) |
| *H04W 28/26* | (2009.01) |
| *H04W 72/02* | (2009.01) |
| *H04W 72/1263* | (2023.01) |
| *H04W 72/25* | (2023.01) |
| *H04W 72/40* | (2023.01) |
| *H04W 74/0808* | (2024.01) |

(52) U.S. Cl.
CPC ......... *H04W 72/541* (2023.01); *H04W 28/26* (2013.01); *H04W 72/1263* (2013.01); *H04W 74/0808* (2013.01)

(58) Field of Classification Search
CPC .............. H04W 72/541; H04W 28/26; H04W 72/1263; H04W 74/0808; H04W 72/02; H04W 72/25; H04W 72/40
See application file for complete search history.

(56) References Cited

U.S. PATENT DOCUMENTS

| | | | | |
|---|---|---|---|---|
| 12,127,044 | B2 * | 10/2024 | Freda | H04W 4/40 |
| 12,302,352 | B2 * | 5/2025 | Lee | H04W 72/20 |
| 2021/0153167 | A1 * | 5/2021 | Sarkis | H04W 72/0446 |
| 2022/0030612 | A1 * | 1/2022 | Balasubramanian | |
| | | | | H04L 5/0053 |
| 2022/0116191 | A1 * | 4/2022 | Bai | H04W 72/23 |
| 2023/0079867 | A1 * | 3/2023 | Fouad | H04W 76/36 |
| | | | | 370/329 |
| 2023/0262722 | A1 * | 8/2023 | Lee | H04L 1/1812 |
| | | | | 370/329 |
| 2024/0007171 | A1 * | 1/2024 | Zhang | H04B 7/0696 |
| 2024/0340959 | A1 * | 10/2024 | Deng | H04W 74/002 |
| 2024/0381384 | A1 * | 11/2024 | Selvanesan | H04W 72/25 |

(Continued)

FOREIGN PATENT DOCUMENTS

| | | | |
|---|---|---|---|
| WO | 2022020563 | A1 | 1/2022 |
| WO | 2022160080 | A1 | 8/2022 |

OTHER PUBLICATIONS

International Search Report and Written Opinion—PCT/US2024/022832—ISA/EPO—Aug. 6, 2024.

*Primary Examiner* — Harry H Kim

(74) *Attorney, Agent, or Firm* — Arent Fox Schiff LLP

(57) ABSTRACT

Aspects described herein relate to receiving a sidelink resource reservation for receiving, at a first user equipment (UE), a first sidelink transmission from a second UE, selecting a first set of resources for transmitting a second sidelink transmission to a third UE, and reselecting, based on a self-interference metric corresponding to the first sidelink transmission received from the second UE, from the first set of resources to a second set of resources for transmitting the second sidelink transmission to the third UE.

21 Claims, 9 Drawing Sheets

(56) References Cited

U.S. PATENT DOCUMENTS

| | | | |
|---|---|---|---|
| 2025/0039873 A1* | 1/2025 | Zhang | H04L 1/0026 |
| 2025/0096876 A1* | 3/2025 | Zhang | H04B 7/0696 |
| 2025/0097974 A1* | 3/2025 | Ding | H04W 72/566 |
| 2025/0240795 A1* | 7/2025 | Lee | H04W 4/40 |

* cited by examiner

400

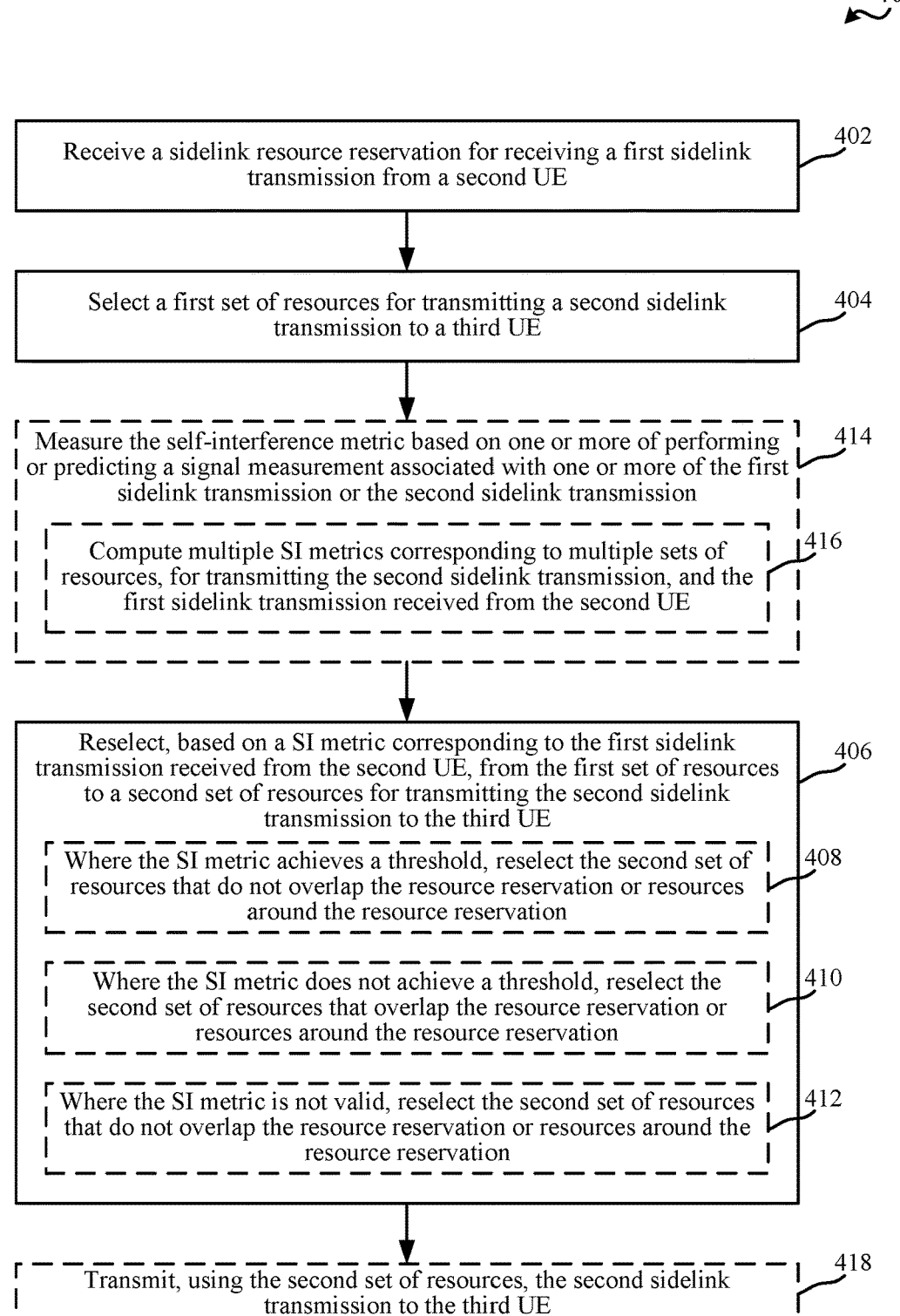

Receive a sidelink resource reservation for receiving a first sidelink transmission from a second UE — 402

Select a first set of resources for transmitting a second sidelink transmission to a third UE — 404

Measure the self-interference metric based on one or more of performing or predicting a signal measurement associated with one or more of the first sidelink transmission or the second sidelink transmission — 414

Compute multiple SI metrics corresponding to multiple sets of resources, for transmitting the second sidelink transmission, and the first sidelink transmission received from the second UE — 416

Reselect, based on a SI metric corresponding to the first sidelink transmission received from the second UE, from the first set of resources to a second set of resources for transmitting the second sidelink transmission to the third UE — 406

Where the SI metric achieves a threshold, reselect the second set of resources that do not overlap the resource reservation or resources around the resource reservation — 408

Where the SI metric does not achieve a threshold, reselect the second set of resources that overlap the resource reservation or resources around the resource reservation — 410

Where the SI metric is not valid, reselect the second set of resources that do not overlap the resource reservation or resources around the resource reservation — 412

Transmit, using the second set of resources, the second sidelink transmission to the third UE — 418

FIG. 4

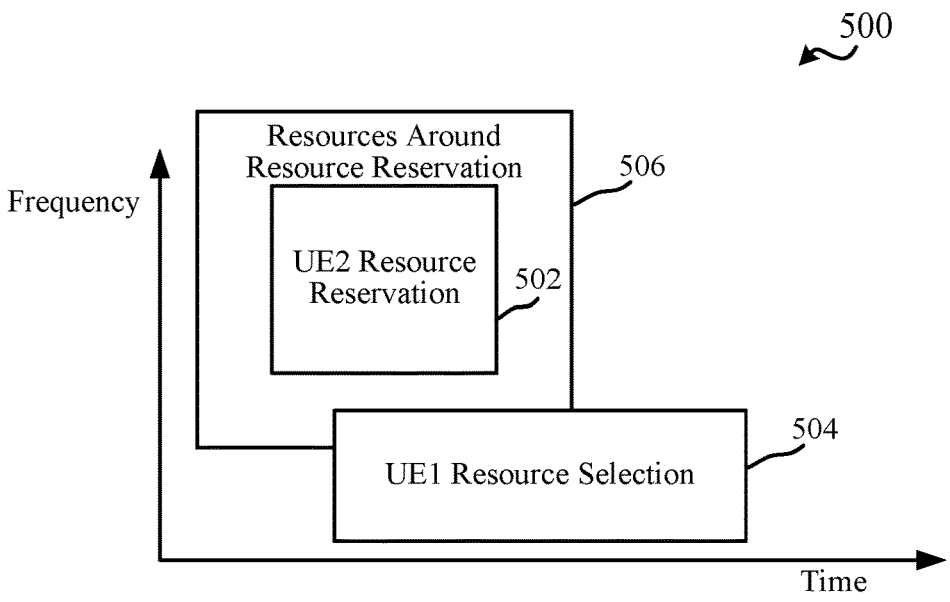
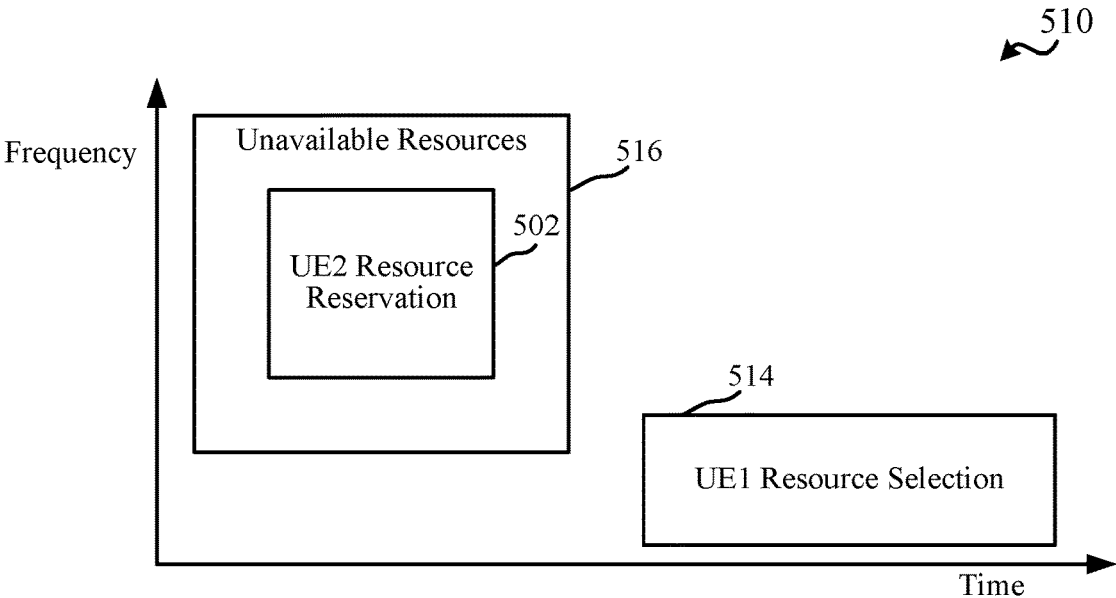
FIG. 5

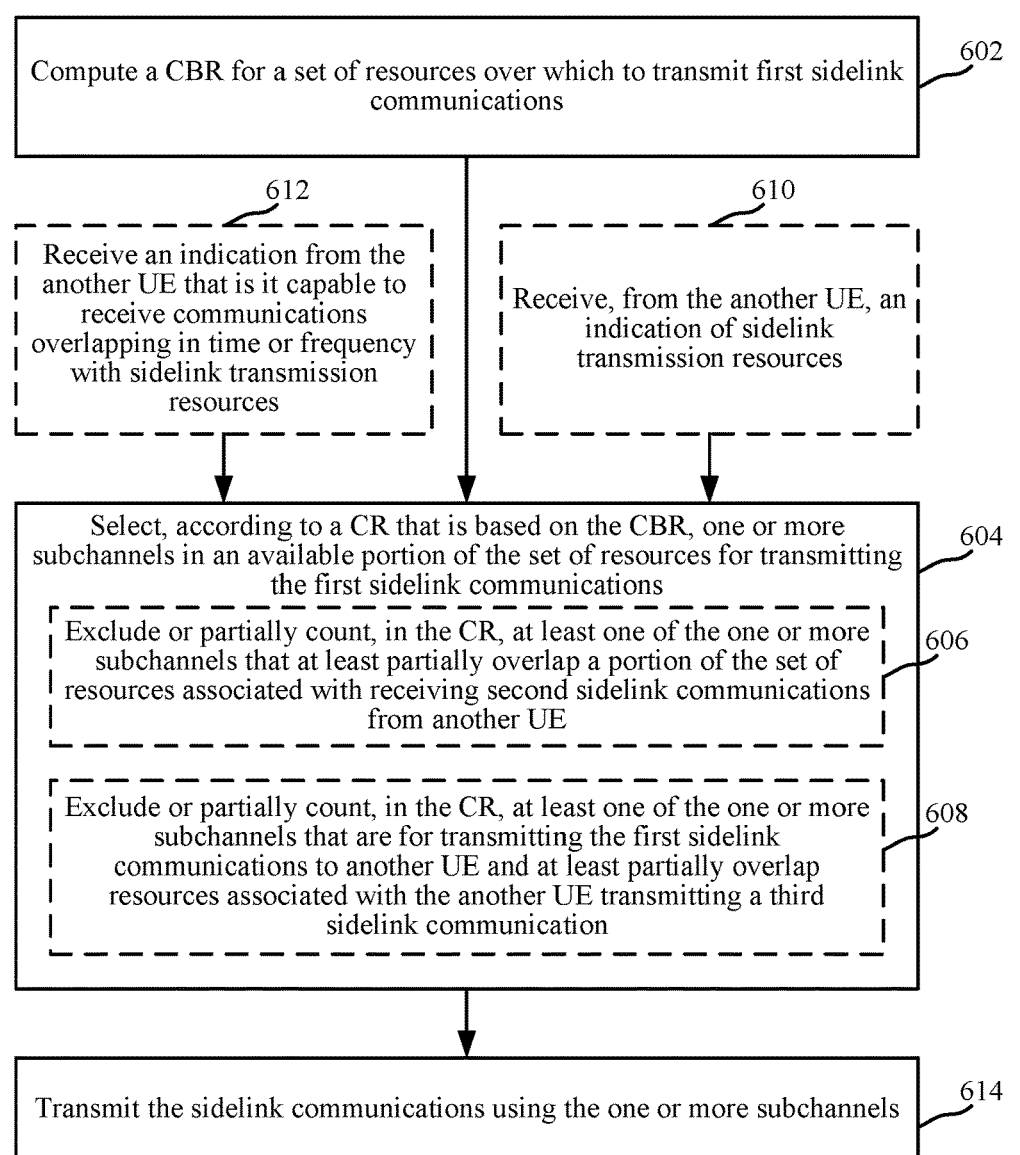

600

Compute a CBR for a set of resources over which to transmit first sidelink communications — 602

Receive an indication from the another UE that is it capable to receive communications overlapping in time or frequency with sidelink transmission resources — 612

Receive, from the another UE, an indication of sidelink transmission resources — 610

Select, according to a CR that is based on the CBR, one or more subchannels in an available portion of the set of resources for transmitting the first sidelink communications — 604

Exclude or partially count, in the CR, at least one of the one or more subchannels that at least partially overlap a portion of the set of resources associated with receiving second sidelink communications from another UE — 606

Exclude or partially count, in the CR, at least one of the one or more subchannels that are for transmitting the first sidelink communications to another UE and at least partially overlap resources associated with the another UE transmitting a third sidelink communication — 608

Transmit the sidelink communications using the one or more subchannels — 614

FIG. 6

700

710

Receive an indication from the another UE that is it capable to receive communications overlapping in time or frequency with sidelink transmission resources

708

Receive, from the another UE, an indication of sidelink transmission resources

Compute a CBR for a set of resources over which to transmit first sidelink communications    702

Exclude or partially count, in the CBR, one or more subchannels that at least partially overlap a portion of the set of resources associated with receiving second sidelink communications from another UE or another UE transmitting third sidelink communications    704

Exclude or partially count, in the CBR, one or more subchannels that are for transmitting the first sidelink communications to another UE and at least partially overlap resources associated with the another UE transmitting a third sidelink communication    706

Select, according to a CR that is based on the CBR, at least one of the one or more subchannels in an available portion of the set of resources for transmitting the first sidelink communications    712

Transmit the sidelink communications using the at least one of the one or more subchannels    714

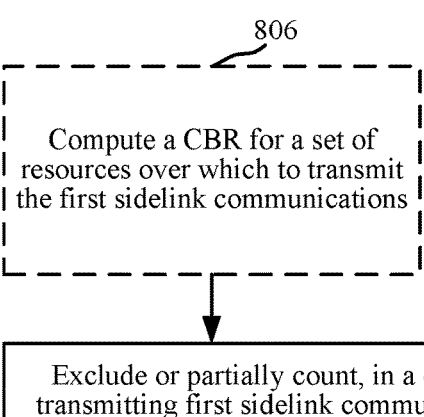

Compute a CBR for a set of resources over which to transmit the first sidelink communications Exclude or partially count, in a count of subchannels associated with transmitting first sidelink communications, one or more subchannels of multiple subchannels, where the one or more subchannels at least one of partially overlap a portion of a set of resources associated with receiving second sidelink communications or correspond to transmitting the first sidelink communications to another UE and partially overlap resources associated with the another UE transmitting third sidelink communications

802

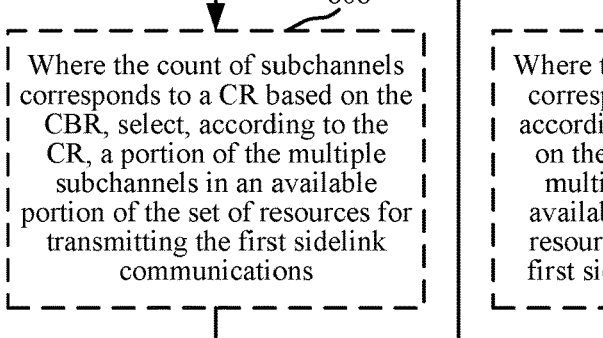

808

Where the count of subchannels corresponds to a CR based on the CBR, select, according to the CR, a portion of the multiple subchannels in an available portion of the set of resources for transmitting the first sidelink communications

810

Where the count of subchannels corresponds to a CBR, select, according to a CR that is based on the CBR, a portion of the multiple subchannels in an available portion of the set of resources for transmitting the first sidelink communications Transmit the first sidelink communications based on the count of subchannels

TECHNIQUES FOR RESELECTING SIDELINK RESOURCES IN FULL DUPLEX WIRELESS COMMUNICATIONS

FIELD OF THE DISCLOSURE

Aspects of the present disclosure relate generally to wireless communication systems, and more particularly, to techniques for selecting or reselecting sidelink resources in full duplex (FD) configurations.

DESCRIPTION OF RELATED ART

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect. 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus capable of full-duplex communication on a sidelink is provided that includes a transceiver, a memory configured to store instructions, and one or more processors communicatively coupled with the memory and the transceiver. The one or more processors are configured to execute the instructions to cause the apparatus to receive a sidelink resource reservation for receiving, at the apparatus, a first sidelink transmission from a second user equipment (UE), select a first set of resources for transmitting a second sidelink transmission to a third UE, and reselect, based on a self-interference metric corresponding to the first sidelink transmission received from the second UE, from the first set of resources to a second set of resources for transmitting the second sidelink transmission to the third UE.

In another aspect, an apparatus capable of full-duplex communication on a sidelink is provided that includes a transceiver, a memory configured to store instructions, and one or more processors communicatively coupled with the memory and the transceiver. The one or more processors are configured to execute the instructions to cause the apparatus to exclude or partially count, in a count of subchannels associated with transmitting first sidelink communications, one or more subchannels of multiple subchannels, where the one or more subchannels at least one of: partially overlap a portion of a set of resources associated with receiving second sidelink communications from another UE; or correspond to transmitting the first sidelink communications to another UE and partially overlap resources associated with the another UE transmitting third sidelink communications, and transmit the first sidelink communications based on the count of subchannels.

In another aspect, a method for wireless communication at a first UE capable of full-duplex communication on a sidelink is provided that includes receiving, at the first UE, a first sidelink transmission from a second UE, selecting a first set of resources for transmitting a second sidelink transmission to a third UE, and reselecting, based on a self-interference metric corresponding to the first sidelink transmission received from the second UE, from the first set of resources to a second set of resources for transmitting the second sidelink transmission to the third UE.

In another example, a method for wireless communication at a UE is provided that includes excluding or partially counting, in a count of subchannels associated with transmitting first sidelink communications, one or more subchannels of multiple subchannels, where the one or more subchannels at least one of: partially overlap a portion of a set of resources associated with receiving second sidelink communications from another UE; or correspond to transmitting the first sidelink communications to another UE and partially overlap resources associated with the another UE transmitting third sidelink communications, and transmitting the first sidelink communications based on the count of subchannels.

In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 4 is a flow chart illustrating an example of a method for selecting or reselecting resources for sidelink (SL) transmissions based on self-interference (SI), in accordance with aspects described herein;

FIG. 5 illustrates examples of resource allocations including a resource reservation and selected SL transmission resources, in accordance with aspects described herein;

FIG. 6 is a flow chart illustrating an example of a method for selecting or reselecting resources for SL transmissions based on an incentive rule for computing channel occupancy ratio, in accordance with aspects described herein;

FIG. 7 is a flow chart illustrating an example of a method for selecting or reselecting resources for SL transmissions based on an incentive rule for computing channel busy ratio, in accordance with aspects described herein;

FIG. 8 is a flow chart illustrating an example of a method for excluding or partially counting subchannels in counting subchannels for sidelink transmissions, in accordance with aspects described herein.

DETAILED DESCRIPTION

Figure 1:
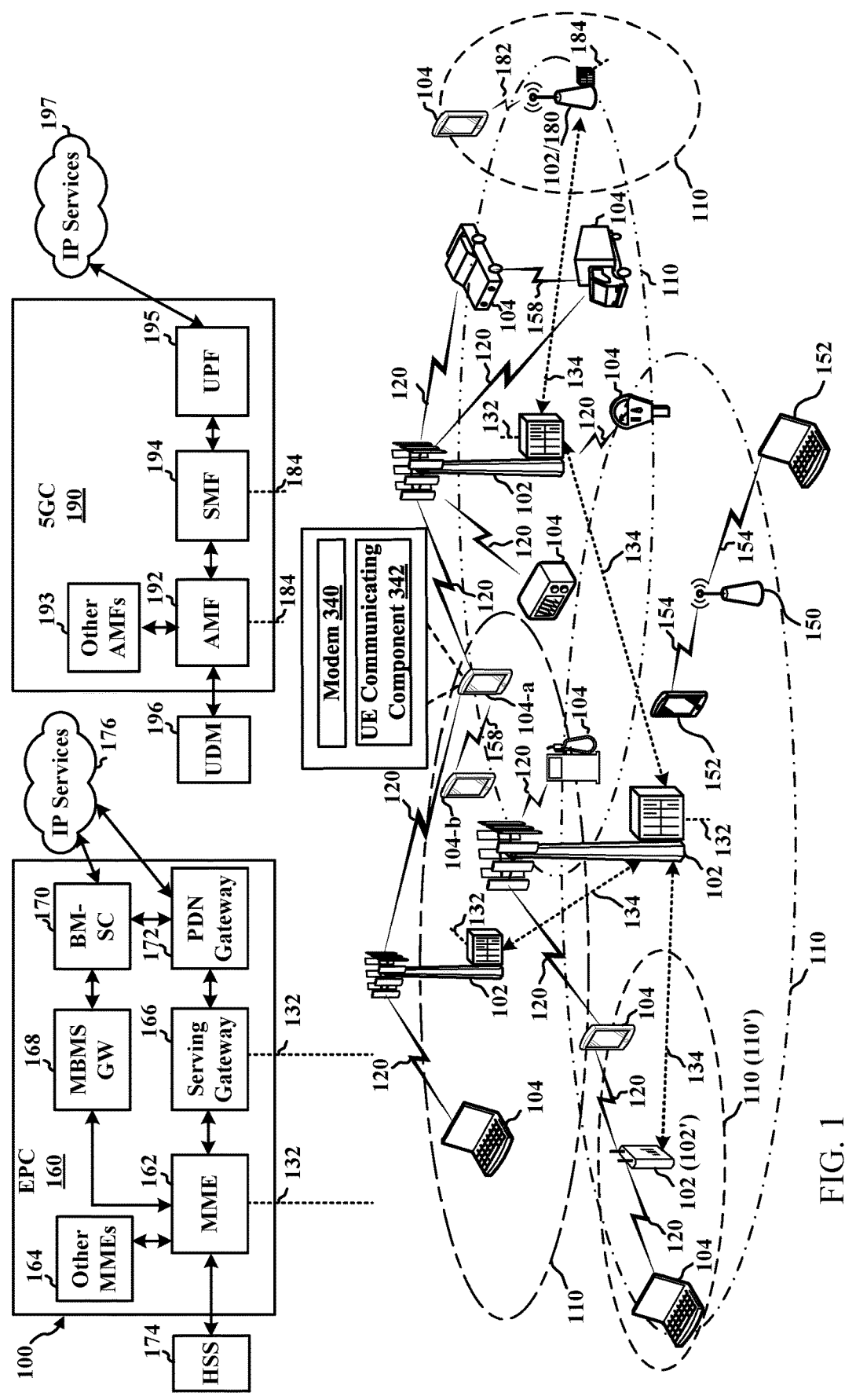
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to selecting or reselecting sidelink (SL) resources for full duplex (FD) wireless communications. For example, a device, such as a user equipment (UE) in fifth generation (5G) new radio (NR) or other wireless communication technologies, can select or reselect SL resources for FD wireless communications based on a feasibility of the resources considering possible self-interference. In another example, the device can be incentivized to select certain SL resources for FD wireless communications based on rules defined in a wireless communications technology standard, such as 5G NR, for computing resources that can be utilized by the device.

In 5G NR, for example, a UE can be configured in SL mode 2 where a network node can configure a pool of resources for SL communications, and UEs can autonomously select from the pool of resources for transmitting SL communications. For example, a first UE (e.g., a SL transmitting UE) can select resources from the pool of resources and can transmit SL control information to a second UE (e.g., a SL receiving UE) to indicate the selected resources. An indication of the selected resources received at the second UE can be referred to herein as a resource reservation. In an example, the second UE can be a FD capable UE that can also transmit SL communications to one or more UEs in a same or overlapping time period of (e.g., simultaneously with) the resource reservation over which the second UE is to receive communications from the first UE. For example, the FD capable UE can transmit the SL communications simultaneously with the resource reservation so long as any self-interference (SI) from the transmission to the reception over the resource reservation is below a threshold. In this regard, the FD capable UE may select transmission resources that are overlapping the resource reservation in time or frequency, or overlapping resources surrounding the resource reservation in time or frequency, based on a level of SI caused by using the overlapping resources. In other examples, the UE can mitigate the SI by transmit or receive beam selection, guard band, digital interference cancellation (IC), etc.

In addition, in 5G NR, resource reselection can be triggered by multiple events at the UE. For example, for selected resources of a periodic SL Tx grant, reselection can be triggered when a SL resource reselection counter maintained at the UE is of a certain value (e.g., 0) and/or when the SL resource reselection counter is of a different value (e.g., 1) and a random number initialized at the media access control (MAC) layer is greater than a threshold sl-ProbResourceKeep. In another example, resource reselection can be triggered if a transmission resource grant is not used for a while, if the transmission resource grant does not accommodate a transport block (TB) to be transmitted, if the resource pool is reconfigured, etc.

As the UE moves around different locations in coverage of the wireless network, SI can change for the UE, as strong reflectors between the UE and other UEs can become present in a UE's new location. As such, for the FD capable UE, in an example, selected resources may later affect receptions on the resource reservation due to varying SI. Though changes in SI can be detected, the FD capable UE may not be able to reselect resources to avoid affecting the resource reservation based on the current reselection techniques described above. The SI caused by the resource selected by the FD capable UE for transmitting SL communications can be measured via a latest dedicated reference signal (RS) or the FD capable UE's own ongoing traffic, or based on predicting SI (e.g., via artificial intelligence (AI) or machine learning (ML)).

Some aspects described herein relate to a FD capable UE reselecting resources for transmitting SL communications when varying SI causes significant interference to a resource reservation. For example, the SI for the resource reservation when the SL transmission resources were selected may have been acceptable, but the SI may have changed in a subsequent time period and causes significant interference in the subsequent time period, such to trigger reselection of the SL transmission resources by the FD capable UE. In an example, resources around the resource reservation (e.g., in adjacent time and/or frequency) can be considered unavailable based on the SI, and the FD capable UE can reselect SL transmission resources that do not overlap the resource reservation or the resources around the resource reservation. In an example, when the varying SI decreases (e.g., as the UE or reflector moves locations), the UE can reselect the original SL transmission resources or other resources that may overlap the resource reservation or the resources around the resource reservation.

In this or other aspects, the wireless communication technology standard of the UE (e.g., 5G NR) can define incentive rules for FD resource selection. For example, in 5G NR, congestion control can be provided based on a channel busy ratio (CBR), defined as a portion of subchannels whose SL received signal strength indicator (RSSI) exceeds a threshold sensed over 100 or $100*2^\mu$ slots, and a channel occupancy ratio (CR), defined for a slot n as the total number of subchannels used by the UE for transmissions in slots [n−a, n−1] and granted in slots [n, n+b] divided by the total number of configured subchannels in the transmission resource pool over [n−a, n+b]. In an example, the FD capable UE can be incentivized to select (or reselect) resources for transmitting SL communications that overlap the resource reservation (or resources around the resource reservation) by allowing these resources to not be counted (or partially counted) in computing CBR and/or CR, which can result in larger resource selection for transmitting SL communications in view of congestion control Similarly, in an example, another UE can be similarly incentivized to select the transmission resource of the FD capable UE for transmitting to the FD capable UE, e.g., by allowing the other UE to not count, or partially count, the resources indicated by the FD capable UE for transmitting SL communications in computing CBR and/or CR, which can result in larger resource selection for the other UE to transmit to the FD capable UE.

In accordance with aspects described herein, a FD capable UE or other device can accordingly reselect resources for transmitting SL communications to mitigate varying SI, which can improve reception quality for SL communications received by the FD capable UE from other UEs. This can improve receiver performance and throughput at the FD capable UE, which can improve power consumption, etc., and thus user experience when using the UE or other device. In addition, the incentive rules described herein can incentivize UEs to select overlapping resources for communications with FD capable UEs, which can improve resource usage allowing more UEs to use the resource spectrum, or allow larger resource grants to UEs, which can improve transmitter performance, latency, and throughput, and thus user experience when using the UE or other device.

The described features will be presented in more detail below with reference to FIGS. 1-9.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, single carrier-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 340 and UE communicating component 342 for selecting or reselecting resources for transmitting SL communications, in accordance with aspects described herein. Though a UE 104 is shown as having the modem 340 and UE communicating component 342, this is one illustrative example, and substantially any node or type of node may include a modem

340 and UE communicating component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an SI interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, head compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHZ (e.g., 5, 10, 15, 20, 100, 400, etc. MHz) bandwidth per carrier allocated in a carrier aggregation of up to a total of Yx MHZ (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHZ and a wavelength between 1 millimeter and 10 millimeters. Radio waves in the band may be referred to as a millimeter wave. Near mmW may extend down to a frequency of 3 GHZ with a wavelength of 100 millimeters. The super high frequency (SHF) band extends between 3 GHZ and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting cMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), cFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS, e.g., BS 102), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In an example, UE 104-*a* and UE 104-*b* can be communicating using SL communications. For example, UE 104-*b* can schedule UE 104-*a* with a resource reservation of resources for receiving SL communications from UE 104-*b*. UE 104-*a* can be a FD capable UE, and UE communicating component 342 can select other resources for transmitting SL communications to another UE (not shown). UE communicating component 342 may detect SI caused by transmitting the SL communications to the SL communications received from UE 104-*b* achieving a threshold. For example, the change in SI can be caused by presence of a strong reflector for transmitting the SL communications, and may be temporary as the UE 104-*a*, UE 104-*b*, a UE to which UE 104-*a* transmits sidelink communications, and/or the reflector move locations. In any case, based on detecting the SI achieving the threshold, UE communicating component 342 can reselect the resources used (in time and/or in frequency) for transmitting SL communications to the other UE so to mitigate the associated SI. In another example, UE communicating component 342 can use incentive rules in selecting or reselecting resources for transmitting sidelink communications to overlap a resource reservation, such to improve spectrum usage, as described herein.

Figure 2:
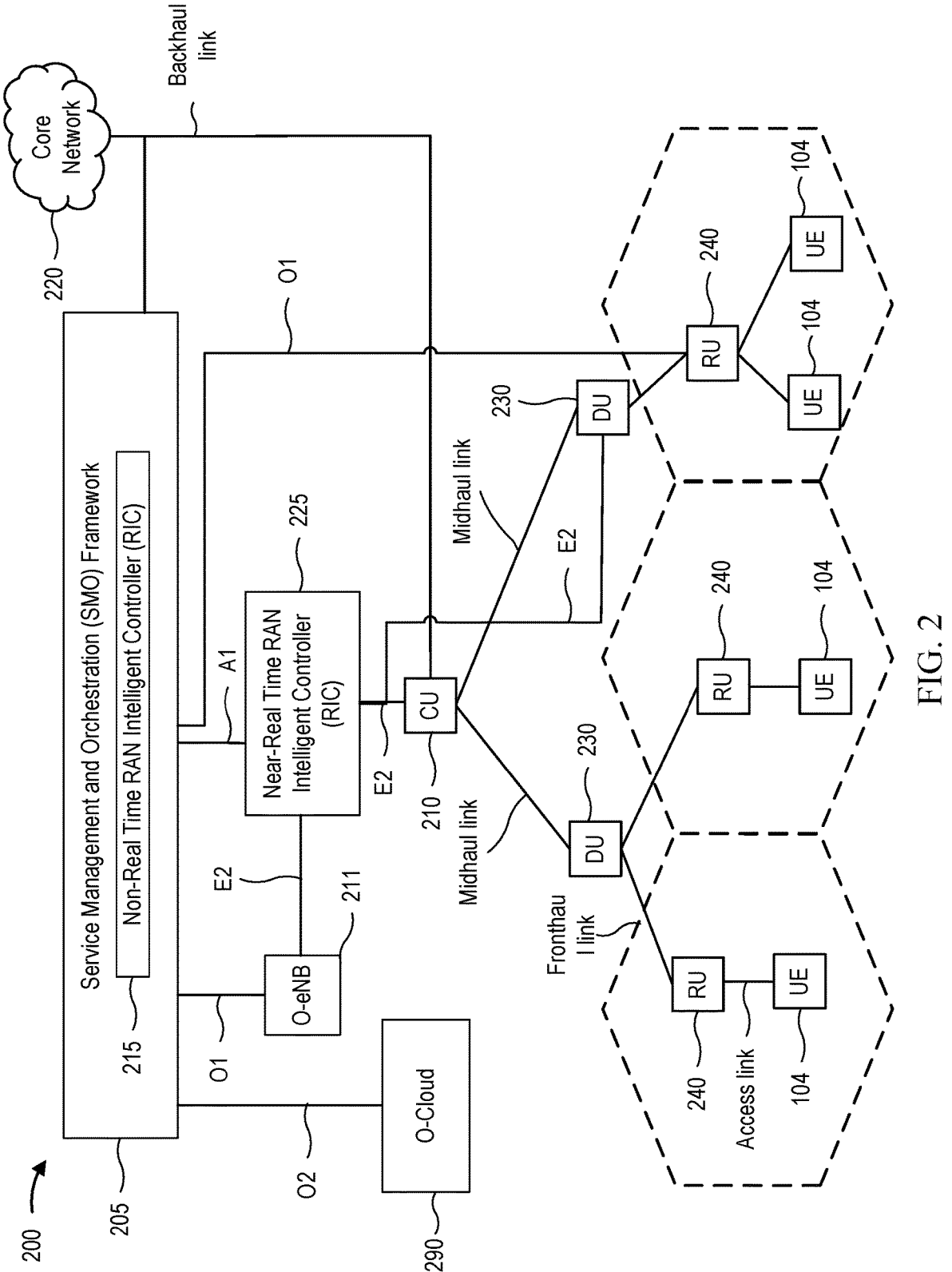
FIG. 2 is a diagram illustrating an example of disaggregated base station architecture, in accordance with various aspects of the present disclosure.

FIG. 2 shows a diagram illustrating an example of disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-cNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Turning now to FIGS. 3-9, aspects are depicted with reference to one or more components and one or more methods that may perform the actions or operations described herein, where aspects in dashed line may be optional. Although the operations described below in FIGS. 4 and 6-8 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Figure 3:
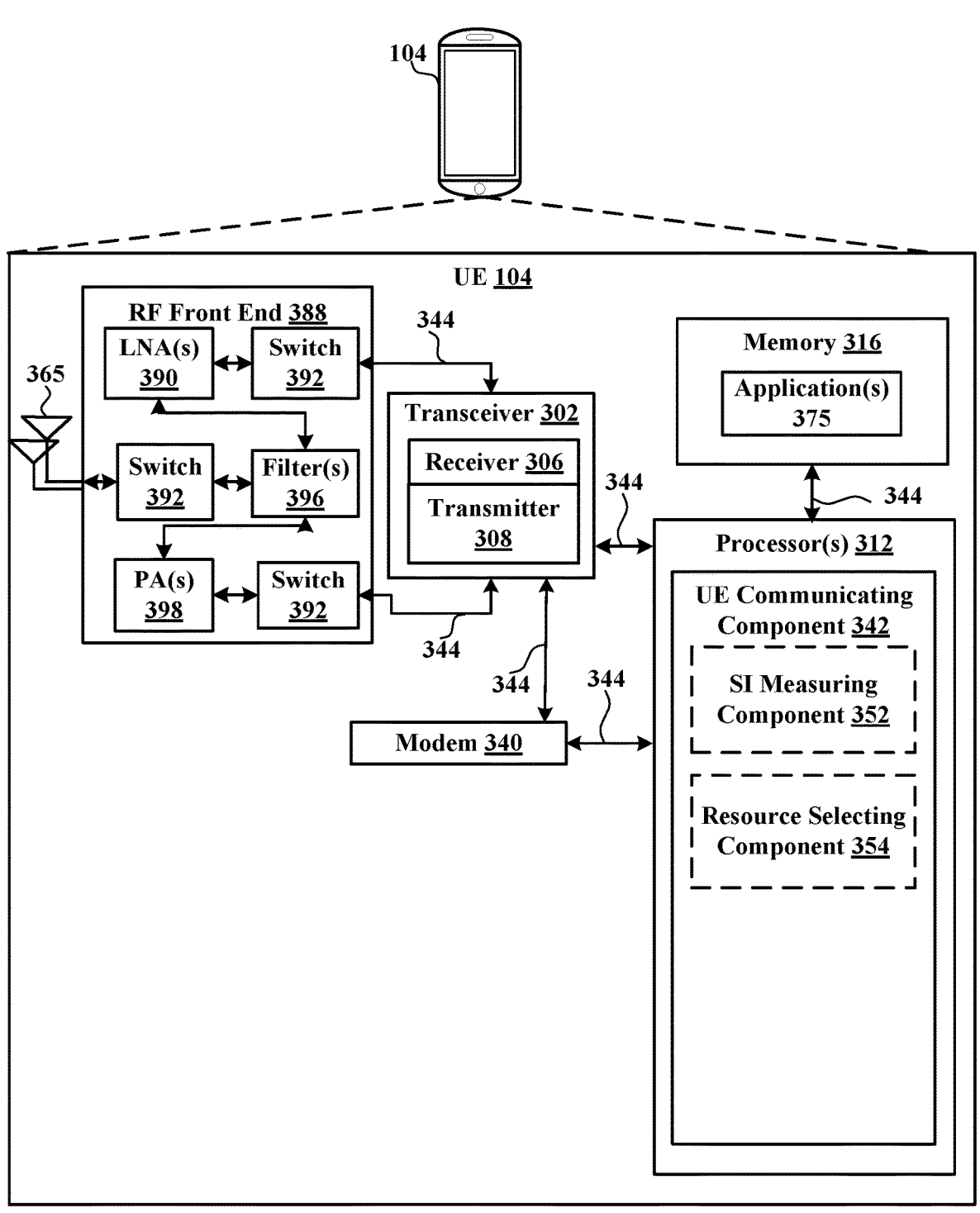
FIG. 3 is a block diagram illustrating an example of a user equipment (UE), in accordance with various aspects of the present disclosure.

Referring to FIG. 3, one example of an implementation of UE 104 may include a variety of components, some of which have already been described above and are described further herein, including components such as one or more processors 312 and memory 316 and transceiver 302 in communication via one or more buses 344, which may operate in conjunction with modem 340 and/or UE communicating component 342 for selecting or reselecting resources for transmitting SL communications, in accordance with aspects described herein.

In an aspect, the one or more processors 312 can include a modem 340 and/or can be part of the modem 340 that uses one or more modem processors. Thus, the various functions related to UE communicating component 342 may be included in modem 340 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 340 associated with UE communicating component 342 may be performed by transceiver 302.

Also, memory 316 may be configured to store data used herein and/or local versions of applications 375 or UE communicating component 342 and/or one or more of its subcomponents being executed by at least one processor 312. Memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining UE communicating component 342 and/or one or more of its subcomponents, and/or data associated therewith, when UE 104 is operating at least one processor 312 to execute UE communicating component 342 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one base station 102. Additionally, receiver 306 may process such received signals, and also may obtain measurements of the signals, such as, but not limited to, Ec/Io, signal-to-noise ratio (SNR), reference signal received power (RSRP), received signal strength indicator (RSSI), etc. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, UE 104 may include RF front end 388, which may operate in communication with one or more antennas 365 and transceiver 302 for receiving and transmitting radio transmissions, for example, wireless communications transmitted by at least one base station 102 or wireless transmissions transmitted by UE 104. RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that UE 104 can communicate with, for example, one or more base stations 102 or one or more cells associated with one or more base stations 102. In an aspect, for example, modem 340 can configure transceiver 302 to operate at a specified frequency and power level based on the UE configuration of the UE 104 and the communication protocol used by modem 340.

In an aspect, modem 340 can be a multiband-multimode modem, which can process digital data and communicate with transceiver 302 such that the digital data is sent and received using transceiver 302. In an aspect, modem 340 can be multiband and be configured to support multiple frequency bands for a specific communications protocol. In an aspect, modem 340 can be multimode and be configured to support multiple operating networks and communications protocols. In an aspect, modem 340 can control one or more components of UE 104 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 342 can optionally include a SI measuring component 352 for measuring SI caused by transmitting SL communications (e.g., via transmitter 308) to receiving SL communications (e.g., via receiver 306), and/or a resource selecting component 354 for selecting or reselecting resources for SL transmissions based on the measured SI.

In an aspect, the processor(s) 312 may correspond to one or more of the processors described in connection with the UE in FIG. 9. Similarly, the memory 316 may correspond to the memory described in connection with the UE in FIG. 9.

FIG. 4 illustrates a flow chart of an example of a method 400 for selecting or reselecting resources for SL transmissions based on SI, in accordance with aspects described herein. In an example, a UE 104 or other device (e.g., an IoT device, EH device, etc.) can perform the functions described in method 400 shown in FIG. 4 using one or more of the components described in FIGS. 1 and 3.

In method 400, at Block 402, a sidelink resource reservation for receiving a first sidelink transmission from a second UE can be received. In an aspect, UE communicating component 342, e.g., in conjunction with processor(s) 312, memory 316, transceiver 302, etc., can receive the sidelink resource reservation for receiving the first sidelink transmission from the second UE. For example, UE 104 can be a first UE (e.g., UE 104-a) communicating with the second UE (e.g., UE 104-b) using SL communications. The UEs may use SL mode 2 such that a network node can allocate a pool of resources from which the UEs can select for transmitting SL communications. In this regard, for example, the second UE (e.g., UE 104-b) can select resources for transmitting SL communications to the first UE (e.g., UE 104-a), and can transmit an indication of the selected resources (the resource reservation) to the first UE.

For example, the second UE can transmit, and UE communicating component 342 of the first UE can receive, the indication of the resource reservation in sidelink control information (SCI) (e.g., using PSCCH, PSSCH, etc.), where the resource reservation can indicate the time and/or frequency resources selected by the second UE for transmitting sidelink communications to the first UE. In some examples, resource reservation may include a periodic resource reservation of multiple resources over multiple periods of time, which may be defined by a starting resource, a length of resources in time, a period between resources, etc. In any case, UE communicating component 342 can receive information for a time period and frequency for the resource reservation, and can determine a SI metric for the resource reservation for selecting or reselecting resources for transmitting SL communications to another UE (e.g., back to the second UE or a different UE).

In method 400, at Block 404, a first set of resources for transmitting a second sidelink transmission to a third UE can be selected. In an aspect, resource selecting component 354, e.g., in conjunction with processor(s) 312, memory 316, transceiver 302, UE communicating component 342, etc., can select the first set of resources for transmitting the second sidelink transmission to the third UE. For example, resource selecting component 354 can select the first set of resources based on a SI metric for SI caused to the resources of the resource reservation by SL transmissions from the first UE (e.g., UE 104-a). In another example, resource selecting component 354 can select the first set of resources based on an incentive rule to select resources that overlap the resources of the resource reservation (or a set of resources around the resource reservation) for the FD capable first UE. This can enable the FD capable first UE to conserve resource spectrum usage by reusing at least a portion of the resource reservation (or set of resources around the resource reservation) also for transmitting SL communications in FD. An example is shown in FIG. 5.

FIG. 5 illustrates examples of resource allocations 500 and 510 including a resource reservation and selected SL transmission resources, in accordance with aspects described herein. In resource allocation 500, UE communicating component 342 can receive the second UE (UE2) resource reservation 502. Resource selecting component 354 of the first UE (UE1) can select SL transmission resources, UE1 resource selection 504, for transmitting SL communications to another UE. Based on an SI metric for transmitting SL communications being within or less than a threshold and/or based on one or more incentive rules as described further herein, for example, resource selecting component 354 can select the UE1 resource selection 504 to overlap the UE2 resource reservation 502 and/or some resources around the resource reservation 506 (e.g., adjacent to the resource reservation 502 in time and/or in frequency). For example, the resources around the resource reservation 506 can be defined by a guard time and/or frequency around the resource reservation 502, which may be indicated in a wireless communication technology standard (e.g., 5G NR) or otherwise configured by the network node, the first UE, the second UE, etc. As the SI metric is within the threshold, using the resources in UE1 resource selection 504 may not cause significant SI to communications received in UE2 resource reservation 502.

In method 400, at Block 406, from the first set of resources, a second set of resources can be reselected to for transmitting the second sidelink transmission to the third UE based on a SI metric corresponding to the first sidelink transmission received from the second UE. In an aspect, resource selecting component 354, e.g., in conjunction with processor(s) 312, memory 316, transceiver 302, UE communicating component 342, etc., can reselect, based on the SI metric corresponding to the first sidelink transmission received from the second UE, from the first set of resources to the second set of resources for transmitting the second sidelink transmission to the third UE. For example, the SI metric can be compared to a threshold, and where the SI metric achieves the threshold, this can indicate that the SL transmissions should not use resources that overlap the resource reservation, or overlap some resources around the resource reservation (e.g., in a guard time or frequency around the resource reservation). In one example, resource selecting component 354 can determine a guard time or frequency around the resource reservation as a function of the SI or comparison to the threshold. In another example, resource selecting component 354 can compare the SI to different thresholds, where the different thresholds can indicate the guard time or frequency around the resource reservation. In any case, resource selecting component 354 can reselect the first set of resources to the second set of resources that do not overlap the resource reservation or guard time or frequency around the resource reservation for use in transmitting SL communications.

For example, referring to resource allocation 510 in FIG. 5, for FD capable UE, e.g., UE1, the resource reselection can be triggered when caused SI becomes non-negligible to resources for receiving sidelink communications, from some overlapping transmission resources e.g., the resources in the resource reservation and/or its surrounding resource in time/frequency. Based on the SI, these resources can become unavailable resources 516 for SL transmission for UE1. In this case, resource selecting component 354 can select resources for transmitting SL communications by the FD capable UE that are outside the newly unavailable resource 516, such as resources in UE1 resource selection 514. As described, for example, the unavailable resources 516 for a given resource reservation 502 can be determined by the FD capable UE (e.g., by resource selecting component 354) based on guard time or frequency that may allow the SI to be below (or at) the threshold, or can be defined by a rule in the wireless communication technology (e.g., 5G NR), such as a number of resource units or subchannels around or overlapping with the resource reservation in time and/or frequency. As such, for example, resource selecting component 354 can reselect the second set of resources (e.g., the UE1 resource selection 514) for transmitting the SL communications to be outside of (e.g., not overlapping) the unavailable resources 516 in time or in frequency. In one example, UE1 resource selection 514 may overlap the unavailable resources 516 in frequency but not time, or may overlap the unavailable resources 516 in time but not frequency.

In one example, in reselecting to the second set of resources at Block 406, optionally at Block 408, where the SI metric achieves a threshold, the second set of resources that do not overlap the resources reservation or resources around the resource reservation can be reselected. In an aspect, resource selecting component 354, e.g., in conjunction with processor(s) 312, memory 316, transceiver 302, UE communicating component 342, etc., can, where the SI metric achieves the threshold, reselect the second set of resources that do not overlap the resource reservation or resources around the resource reservation (e.g., guard time or frequency resources, such as unavailable resources 516). This may occur, for example, where the first set of resources include the UE1 resource selection 504, and SI changes from being within the threshold to at or over the threshold. This may trigger reselection of resources, in one example. For example, as described, resource selecting component 354 can compare the SI metric to the threshold to determine whether to reselect to the second set of resources or not, and if so, can reselect the resources of UE1 resource selection 514 or another set of resources that do not overlap UE2 resource reservation 502 or unavailable resources 516. Where the SI metric does not achieve the threshold, the first set of resources may still be usable without causing sufficient SI.

In this example, transmission of SL communications over the selected resources in the first set of resources may not have previously affected the resource reservation, but now does. For example, resource selecting component 354 can determine significant impact by comparing different possible SI related metrics, for e.g., if caused SI, RSRP, RSSI, rise over thermal (RoT), block error rate (BLER) due to self-interference achieves a threshold, if caused signal-to-interference-and-noise ratio (SINR) is less than a threshold, if caused SINR or BLER degradation is less than a threshold, or if caused RSSI or ROT increase is greater than a threshold. As described further herein, the above SI related metrics can be either obtained from the latest measured value or a predicted value.

In one example, in reselecting to the second set of resources at Block 406, optionally at Block 410, where the SI metric does not achieve a threshold, the second set of resources that overlap the resources reservation or resources around the resource reservation can be reselected. In an aspect, resource selecting component 354, e.g., in conjunction with processor(s) 312, memory 316, transceiver 302, UE communicating component 342, etc., can, where the SI metric does not achieve the threshold, reselect the second set of resources that overlap the resource reservation or resources around the resource reservation (e.g., such as resource around the resource reservation 506). This threshold can be the same or different than the threshold in Block 408. This may occur, for example, where the first set of resources include the UE1 resource selection 514 that may have been selected when the SI achieves the threshold, and SI changes from achieving the threshold to at or below the threshold. This may also trigger reselection of resources, in one example. For example, as described, resource selecting component 354 can compare the SI metric to the threshold to determine whether to reselect to the second set of resources or not, and if so, can reselect the resources of UE1 resource selection 504 or another set of resources that at least partially overlap UE2 resource reservation 502 or resources 506.

In some examples, as described further herein, reselecting to the second set of resources where the SI metric threshold is not achieved can include reselecting resources based on an incentive rule that incentivizes selecting resources that overlap the resource reservation or the guard time or frequency around the resource reservation. In another example, reselecting to the second set of resources for transmission to the third UE where the SI metric threshold is not achieved can include reselecting resources based on another incentive rule that incentivizes selecting resources used by the third UE to transmit other sidelink communications. Using the overlapped resources that may have less than the threshold SI can conserve resources in the spectrum and allow more resources to be used for other UEs or additional resources for the other UEs. In another example, the UE may receive a prior signaling from the third UE indicating that it is capable to receive communications overlapping in time and/or frequency with its sidelink transmission resources, as described further herein.

In one example, in reselecting to the second set of resources at Block 406, optionally at Block 412, where the SI metric is not valid, the second set of resources that do not overlap the resources reservation or resources around the resource reservation can be reselected. In an aspect, resource selecting component 354, e.g., in conjunction with processor(s) 312, memory 316, transceiver 302, UE communicating component 342, etc., can, where the SI metric is not valid, reselect the second set of resources that do not overlap the resource reservation or resources around the resource reservation (e.g., guard time or frequency resources, such as unavailable resources 516). This may occur, for example, where the SI metric is expired (e.g., based on an expiration timer) or is otherwise deemed outdated. As such, the impact of the transmitter to the receiver (e.g., the SI) may be uncertain (e.g., cannot be guaranteed as not achieving the threshold) due to no or outdated SI measurement or prediction, as described herein (e.g., the SI metric has not been updated for more than a number X of milliseconds due to no RS or ongoing traffic transmission opportunity). In this example, resource selecting component 354 can accordingly reselect the resources that do not overlap with the resource reservation 502 or unavailable resources 516, such as UE1 resource selection 514.

In method 400, optionally at Block 414, the self-interference metric can be measured based on one or more of performing or predicting a signal measurement associated with one or more of the first sidelink transmission or the second sidelink transmission. In an aspect, SI measuring component 352, e.g., in conjunction with processor(s) 312, memory 316, transceiver 302, UE communicating component 342, etc., can measure the self-interference metric based on one or more of performing or predicting the signal measurement associated with one or more of the first sidelink transmission or the second sidelink transmission. For example, SI measuring component 352 can measure the SI metric as one or more of SI, RSRP, RSSI, ROT, BLER, SINR, etc., as described above, which can be part of a new measurement procedure for evaluating SI or other measurement procedures. For example, SI measuring component 352 can measure the SI metric of a signal received at the receiver 306 of the UE 104, such as a dedicated RS, or sidelink reception, etc., as interfered by a transmission at the transmitter 308 of the UE 104, such as a dedicated RS, sidelink transmission, etc. In one example, the transmission can be over the first set of resources (e.g., in frequency or time) or another set of resources. In an example, this can be a latest performed measurement. In another example, SI measuring component 352 can predict the SI metric in the first set of resources, which may be based on historical measured SI or other considerations using AI or ML, etc.

In measuring the self-interference at Block 414, optionally at Block 416, multiple SI metrics corresponding to multiple sets of resources, for transmitting the second sidelink transmission, and the first sidelink transmission received from the second UE can be computed. In an aspect, SI measuring component 352, e.g., in conjunction with processor(s) 312, memory 316, transceiver 302, UE communicating component 342, etc., can compute the multiple SI metrics corresponding to the multiple sets of resources, for transmitting the second sidelink transmission, and the first sidelink transmission received from the second UE. In this example, resource selecting component 354 can select the second set of resources as one of the multiple sets of resources based on the SI metric. For example, resource selecting component 354 can select the set of resources having the lowest SI metric, the set of resources having the most overlap with the resource reservation or guard time or frequency thereof while having a SI metric that does not achieve the threshold, etc. In another example, when multiple SI metrics corresponding to multiple sets of resources are measured, then reselecting to a second set of resources that do not overlap the resource reservation or resources around the resource reservation (e.g., in Block 408) can be based on none of the multiple SI metrics corresponding to the multiple sets of resources being less than a threshold.

In method 400, optionally at Block 418, the second sidelink transmission can be transmitted to the third UE using the second set of resources. In an aspect. UE communicating component 342, e.g., in conjunction with processor(s) 312, memory 316, transceiver 302, etc., can transmit, using the second set of resources, the second sidelink transmission to the third UE. For example, the third UE can be the second UE or a different UE to which the first UE (e.g., UE 104-*a*) transmits the SL communications in FD and receives SL communications from the second UE (e.g., UE 104-*b*).

In an example, the triggered resource reselection can be beam based for one or more of a transmit beam or receive beam, where the UE 104 can be configured with multiple transmit beams for transmitting SL communications and/or multiple receive beams for receiving SL communications. For example, the rule can be applied to reselection of resources for a given transmit beam. In an example, the first set of resources can correspond to a transmit beam, and the resource reservation can correspond to a receive beam. The SI threshold can be defined per transmit/receive beam pair, such that resource selecting component 354 can reselect to the second set of resources for transmitting SL communications using the transmit beam if the SI caused to communications received on the resource reservation via the receive beam achieve a beam or beam pair specific threshold.

FIG. 6 illustrates a flow chart of an example of a method 600 for selecting or reselecting resources for SL transmissions based on an incentive rule for computing CR, in accordance with aspects described herein. FIG. 7 illustrates a flow chart of an example of a method 700 for selecting or reselecting resources for SL transmissions based on an incentive rule for computing CBR, in accordance with aspects described herein. In an example, a UE 104 or other device (e.g., an IoT device, EH device, etc.) can perform the functions described in method 600 shown in FIG. 6 or method 700 shown in FIG. 7 using one or more of the components described in FIGS. 1 and 3. In one example, methods 600 and 700, or Blocks thereof, may be performed in conjunction with one another to achieve optimized resource spectrum usage based on corresponding incentivization rules.

In 5G NR, congestion control can be managed by configuring up to 16 CBR ranges, where each CBR range correspond to a maximum CR, which CR of a transmitting UE is not to exceed. The transmitting UE can achieve the maximum CR using a certain modulation and coding scheme (MCS), a number of subchannels, a number of retransmissions, etc. Using a higher MCS, less number of subchannels, less number of retransmissions can result in reduced resource utilization of the transmitting UE to achieve the maximum CR in some cases.

In addition, for FD capable UEs, FD-only available resources can be defined as resources that are not available for half duplex (HD)-only UE, but only available for FD capable UE, as long as impact on the receiver for resources of the resource reservation satisfies a requirement, e.g. caused SI less than a threshold. For example, for single frequency FD capable UE, all resource units, e.g. sub-channels, overlapped in time with the resource reservation of a UE transmitting sidelink communications to the FD capable UE can be FD-only available resource for transmission, which are not available for HD-only UE. In another example, for sub-band FD capable UE, all resource units, e.g. sub-channels, overlapped in time but with frequency distance greater than a guard band from the resource reservation of a UE transmitting sidelink communications to the FD capable UE can be FD-only available resource for transmission.

For FD based resource selection, suppose based on measured CBR, the FD capable UE's maximum CR is 2 sub-channels in the slot range [n–a, n+b]. Although transmission by the FD capable UE is not expected to affect receiving SL communications on the resource reservation, it is possible that SI can go unexpectedly high later, e.g. due to presence of strong reflector, as described, which may lead to a preference for non-overlapped resources. In this regard, for example, incentive rules can be defined to incentivize the FD capable UE to select overlapping resources for SL transmission, as described herein, to conserve the radio spectrum and allow other UEs to use the spectrum and/or have additional resources available in the spectrum. Examples described in FIGS. 6 and 7 relate to counting CBR and/or CR for transmitting SL communications based on excluding, or partially counting, resources that overlap the resource reservation for receiving SL communications from another UE and/or resources used by another UE to transmit sidelink communications.

In method 600, at Block 602, a CBR can be computed for a set of resources over which to transmit first sidelink communications. In an aspect, resource selecting component

354, e.g., in conjunction with processor(s) 312, memory 316, transceiver 302, UE communicating component 342, etc., can compute the CBR for the set of resources over which to transmit the first sidelink communications. For example, resource selecting component 354 can compute the CBR for slot n as the portion of subchannels whose SL received signal strength indicator (RSSI) exceeds a threshold sensed over 100 or $100*2^\mu$ slots, as described.

In method 600, at Block 604, one or more subchannels in an available portion of the set of resources can be selected for transmitting the first sidelink communications according to a CR that is based on the CBR. In an aspect, resource selecting component 354, e.g., in conjunction with processor(s) 312, memory 316, transceiver 302, UE communicating component 342, etc., can select, according to a CR that is based on the CBR, the one or more subchannels in the available portion of the set of resources for transmitting the first sidelink communications. For example, resource selecting component 354 can determine the available portion of the set of resources by performing a clear channel assessment or other procedure to determine which resources can be used for transmitting SL communications. In addition, for example, resource selecting component 354 can select the one or more subchannels based on the maximum CR.

In selecting the one or more subchannels at Block 604, optionally at Block 606, at least one of the one or more subchannels that at least partially overlap a portion of the set of resources associated with receiving second sidelink communications from another UE can be excluded or partially counted in the CR. In an aspect, resource selecting component 354, e.g., in conjunction with processor(s) 312, memory 316, transceiver 302, UE communicating component 342, etc., can exclude or partially count, in the CR, at least one of the one or more subchannels that at least partially overlap the portion of the set of resources associated with receiving second sidelink communications from another UE. For example, referring to FIG. 5, resource selecting component 354 can exclude, or partially count, resources of UE1 resource selection 504 that overlap the UE2 resource reservation 502 or resources around the resource reservation 506 based on the incentive rule. This can accordingly allow the UE 104 to use a larger amount of resources, as the overlapping resources do not count (or partially count) towards the CR of the UE 104.

In another example, in selecting the one or more subchannels at Block 604, optionally at Block 608, at least one of the one or more subchannels that are for transmitting the first sidelink communications to another UE and at least partially overlap resources associated with the another UE transmitting third sidelink communications can be excluded or partially counted in the CR. In an aspect, resource selecting component 354, e.g., in conjunction with processor(s) 312, memory 316, transceiver 302, UE communicating component 342, etc., can exclude or partially count, in the CR, at least one of the one or more subchannels that are for transmitting the first sidelink communications to another UE and at least partially overlap resources associated with the another UE transmitting third sidelink communications. For example, resource selecting component 354 can determine to use other resources known to be used by another FD capable UE to transmit third sidelink communications, and these resources may additionally or alternatively be excluded or partially counted in the CR. For example, the other FD capable UE may already be transmitting but is also capable of receiving in FD from UE 104. In this example, resource selecting component 354 can choose a FD resource or opportunity (which can be advertised by the other FD capable UE or otherwise known to UE 104 as available) based on an incentive rule where such FD resources or opportunities used by the other FD capable UE for SL transmissions by UE 104 do not count (or partially count) for the CR of UE 104. In this example, the other FD capable UE can benefit from lower latency of received data from UE 104 over the resources and/or power saving opportunity.

In this example, in method 600, optionally at Block 610, an indication of sidelink transmission resources can be received from the another UE. In an aspect, UE communicating component 342, e.g., in conjunction with processor(s) 312, memory 316, transceiver 302, etc., can receive, from the another UE, the indication of sidelink transmission resources. For example, this may include an indication of frequency location (e.g., frequency resource allocation) of the sidelink transmission resources for transmitting the third sidelink communication. In this regard, resource selecting component 354 can know the location of resources that can be selected to impact the CR.

In addition, in this example, in method 600, optionally at Block 612, an indication can be received from the another UE that it is capable to receive communications overlapping in time or frequency with sidelink transmission resources. In an aspect, UE communicating component 342, e.g., in conjunction with processor(s) 312, memory 316, transceiver 302, etc., can receive the indication from the another UE that it is capable to receive communications overlapping in time or frequency with sidelink transmission resources. In an example, resource selecting component 354 can further determine to select these resources for transmitting the first sidelink communication, and accordingly modify the CR, based on UE communicating component 342 receiving this indication from the another UE. For example, UE communicating component 342 can receive this indication from the another UE in control information, RRC signaling, and/or the like.

In method 600, at Block 614, the sidelink communications can be transmitted using the one or more subchannels. In an aspect, UE communicating component 342. e.g., in conjunction with processor(s) 312, memory 316, transceiver 302, etc., can transmit the sidelink communications using the one or more subchannels. In this regard, for example, the CR of the UE 104 is lowered based on the incentive rules. As described in conjunction with other aspects above, this rule can be applied per beam or beam pair (e.g., per transmit beam used by the UE 104 and/or receive beam used by the UE 104 or the other FD capable UE).

In method 700, at Block 702, a CBR can be computed for a set of resources over which to transmit first sidelink communications. In an aspect, resource selecting component 354, e.g., in conjunction with processor(s) 312, memory 316, transceiver 302, UE communicating component 342, etc., can compute the CBR for the set of resources over which to transmit the first sidelink communications. For example, resource selecting component 354 can compute the CBR for slot n as the portion of subchannels whose SL received signal strength indicator (RSSI) exceeds a threshold sensed over 100 or $100*2^\mu$ slots, as described.

In computing the CBR at Block 702, optionally at Block 704, one or more subchannels that at least partially overlap a portion of the set of resources associated with receiving second sidelink communications from another UE can be excluded or partially counted in the CBR. In an aspect, resource selecting component 354, e.g., in conjunction with processor(s) 312, memory 316, transceiver 302, UE communicating component 342, etc., can exclude or partially count, in the CBR, one or more subchannels that at least partially overlap the portion of the set of resources associated with receiving second sidelink communications from another UE. For example, referring to FIG. 5, resource selecting component 354 can exclude, or partially count, resources of UE1 resource selection 504 that overlap the UE2 resource reservation 502 or resources around the resource reservation 506 based on the incentive rule. This can accordingly allow the UE 104 to use a larger amount of resources, as the overlapping resources do not count (or partially count) towards the CBR of the UE 104.

In another example, in computing the CBR at Block 702, optionally at Block 706, one or more subchannels that are for transmitting the first sidelink communications to another UE and at least partially overlap resources associated with the another UE transmitting third sidelink communications can be excluded or partially counted in the CBR. In an aspect, resource selecting component 354, e.g., in conjunction with processor(s) 312, memory 316, transceiver 302, UE communicating component 342, etc., can exclude or partially count, in the CBR, one or more subchannels that are for transmitting the first sidelink communications to another UE and at least partially overlap resources associated with the another UE transmitting third sidelink communications. For example, resource selecting component 354 can determine to use other resources known to be used by another FD capable UE to transmit third sidelink communications, and these resources may additionally or alternatively be excluded or partially counted in the CBR. For example, the other FD capable UE may already be transmitting but is also capable of receiving in FD from UE 104. In this example, resource selecting component 354 can choose a FD resource or opportunity (which can be advertised by the other FD capable UE or otherwise known to UE 104 as available) based on an incentive rule where such FD resources or opportunities used by the other FD capable UE for SL transmissions by UE 104 do not count (or partially count) for the CBR of UE 104. In this example, other UEs can benefit from lower CBR.

In this example, in method 700, optionally at Block 708, an indication of sidelink transmission resources can be received from the another UE. In an aspect, UE communicating component 342, e.g., in conjunction with processor(s) 312, memory 316, transceiver 302, etc., can receive, from the another UE, the indication of sidelink transmission resources. For example, this may include an indication of frequency location (e.g., frequency resource allocation) of the sidelink transmission resources for transmitting the third sidelink communication. In this regard, resource selecting component 354 can know the location of resources that can be selected to impact the CBR.

In addition, in this example, in method 700, optionally at Block 710, an indication can be received from the another UE that it is capable to receive communications overlapping in time or frequency with sidelink transmission resources. In an aspect, UE communicating component 342, e.g., in conjunction with processor(s) 312, memory 316, transceiver 302, etc., can receive the indication from the another UE that it is capable to receive communications overlapping in time or frequency with sidelink transmission resources. In an example, resource selecting component 354 can further determine to select these resources for transmitting the first sidelink communication, and accordingly modify the CBR, based on UE communicating component 342 receiving this indication from the another UE. For example, UE communicating component 342 can receive this indication from the another UE in control information, RRC signaling, and/or the like.

In method 700, at Block 712, at least one of the one or more subchannels in an available portion of the set of resources can be selected for transmitting the first sidelink communications according to a CR that is based on the CBR. In an aspect, resource selecting component 354, e.g., in conjunction with processor(s) 312, memory 316, transceiver 302, UE communicating component 342, etc., can select, according to a CR that is based on the CBR, at least one of the one or more subchannels in the available portion of the set of resources for transmitting the first sidelink communications. For example, resource selecting component 354 can determine the available portion of the set of resources by performing a clear channel assessment or other procedure to determine which resources can be used for transmitting SL communications. In addition, for example, resource selecting component 354 can select at least one of the one or more subchannels based on the maximum CR.

In method 700, at Block 714, the sidelink communications can be transmitted using the at least one of the one or more subchannels. In an aspect, UE communicating component 342, e.g., in conjunction with processor(s) 312, memory 316, transceiver 302, etc., can transmit the sidelink communications using the at least one of the one or more subchannels. In this regard, for example, the CBR of the UE 104 is lowered based on the incentive rules. As described in conjunction with other aspects above, this rule can be applied per beam or beam pair (e.g., per transmit beam used by the UE 104 and/or receive beam used by the UE 104 or the other FD capable UE).

FIG. 8 is a flow chart illustrating an example of a method 800 for excluding or partially counting subchannels in counting subchannels for sidelink transmissions, in accordance with aspects described herein. In an example, a UE 104 or other device (e.g., an IoT device, EH device, etc.) can perform the functions described in method 800 shown in FIG. 8 using one or more of the components described in FIGS. 1 and 3.

In method 800, at Block 802, one or more subchannels of multiple subchannels can be excluded or partially counted in a count of subchannels associated with transmitting first sidelink communications, where the one or more subchannels at least one of partially overlap a portion of a set of resources associated with receiving second sidelink communications or correspond to transmitting the first sidelink communications to another UE and partially overlap resources associated with the another UE transmitting third sidelink communications. In an aspect, resource selecting component 354, e.g., in conjunction with processor(s) 312, memory 316, transceiver 302, UE communicating component 342, etc., can exclude or partially count, in a count of subchannels associated with transmitting first sidelink communications, one or more subchannels of multiple subchannels, where the one or more subchannels at least one of at least partially overlap a portion of a set of resources associated with receiving second sidelink communications or correspond to transmitting the first sidelink communications to another UE and at least partially overlap resources associated with the another UE transmitting third sidelink communications. For example as described, referring to FIG. 5, resource selecting component 354 can exclude, or partially count, resources of UE1 resource selection 504 that overlap the UE2 resource reservation 502 or resources around the resource reservation 506 based on the incentive rule. This can accordingly allow the UE 104 to use a larger amount of resources, as the overlapping resources do not count (or partially count) towards the CR or CBR of the UE 104. In another example, resource selecting component 354 can determine to use other resources known to be used by another FD capable UE to transmit third sidelink communications, and these resources may additionally or alternatively be excluded or partially counted in the CR or CBR.

In method 800, at Block 804, the sidelink communications can be transmitted based on the count of subchannels. In an aspect, UE communicating component 342. e.g., in conjunction with processor(s) 312, memory 316, transceiver 302, etc., can transmit the sidelink communications based on the count of subchannels. For example, as described above and further herein, the count can impact CR or CBR calculation, and subchannels can be selected based on the count and used to transmit sidelink communications.

For example, where the count corresponds to CR, optionally at Block 806, a CBR for a set of resources over which to transmit the first sidelink communications can be computed. In an aspect, resource selecting component 354, e.g., in conjunction with processor(s) 312, memory 316, transceiver 302, UE communicating component 342, etc., can compute the CBR for the set of resources over which to transmit the first sidelink communications. In this example, optionally at Block 808, where the count of subchannels computed in Block 802 corresponds to the CR based on the CBR, a portion of the multiple subchannels in an available portion of the set of resources can be selected, according to the CR, for transmitting the first sidelink communications. In an aspect, resource selecting component 354, e.g., in conjunction with processor(s) 312, memory 316, transceiver 302, UE communicating component 342, etc., can, where the count of subchannels corresponds to the CR that is based on the CBR, select, according to the CR that is based on the count of subchannels, the portion of the multiple subchannels in the available portion of the set of resources for transmitting the first sidelink communications.

For example, where the count of subchannels computed in Block 802 corresponds to CBR, optionally at Block 810, a portion of the multiple subchannels in an available portion of the set of resources can be selected, according to a CR that is based on the CBR, for transmitting the first sidelink communications. In an aspect, resource selecting component 354, e.g., in conjunction with processor(s) 312, memory 316, transceiver 302, UE communicating component 342, etc., can, where the count of subchannels corresponds to the CBR, select, according to the CR that is based on the CBR, which is based on the count of subchannels, the portion of the multiple subchannels in the available portion of the set of resources for transmitting the first sidelink communications.

Figure 9:
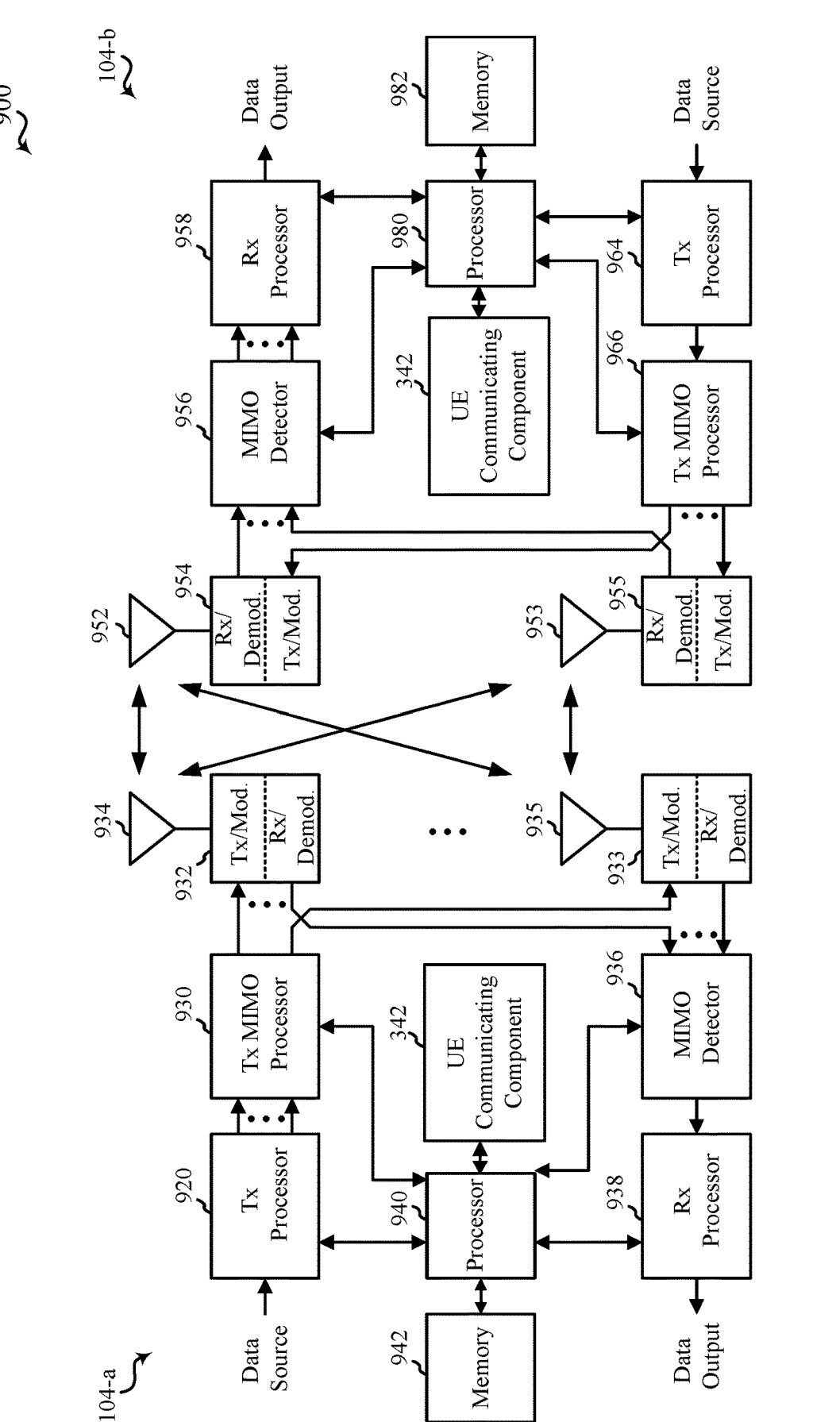
FIG. 9 is a block diagram illustrating an example of a multiple-input multiple-output (MIMO) communication system including a base station and a UE, in accordance with various aspects of the present disclosure.

FIG. 9 is a block diagram of a MIMO communication system 900 including UEs 104-*a*, 104-*b*. The MIMO communication system 900 may illustrate aspects of the wireless communication access network 100 described with reference to FIG. 1. The UE 104-*a* may be an example of aspects of the UE 104 described with reference to FIGS. 1 and 3. The UE 104-*a* may be equipped with antennas 934 and 935, and the UE 104-*b* may be equipped with antennas 952 and 953. In the MIMO communication system 900, the UEs 104-*a*, 104-*b* may be able to send data over multiple communication links at the same time. Each communication link may be called a "layer" and the "rank" of the communication link may indicate the number of layers used for communication. For example, in a 2×2 MIMO communication system where UE 104-*a* transmits two "layers," the rank of the communication link between the UE 104-*a* and the UE 104-*b* is two.

At the UE 104-*a*, a transmit (Tx) processor 920 may receive data from a data source. The transmit processor 920 may process the data. The transmit processor 920 may also generate control symbols or reference symbols. A transmit MIMO processor 930 may perform spatial processing (e.g., precoding) on data symbols, control symbols, or reference symbols, if applicable, and may provide output symbol streams to the transmit modulator/demodulators 932 and 933. Each modulator/demodulator 932 through 933 may process a respective output symbol stream (e.g., for OFDM, etc.) to obtain an output sample stream. Each modulator/demodulator 932 through 933 may further process (e.g., convert to analog, amplify, filter, and upconvert) the output sample stream to obtain a DL signal. In one example, DL signals from modulator/demodulators 932 and 933 may be transmitted via the antennas 934 and 935, respectively.

The UE 104-*b* may be an example of aspects of the UEs 104 described with reference to FIGS. 1 and 3. At the UE 104-*b*, the UE antennas 952 and 953 may receive the signals from the UE 104-*a* (e.g., over a sidelink) and may provide the received signals to the modulator/demodulators 954 and 955, respectively. Each modulator/demodulator 954 through 955 may condition (e.g., filter, amplify, downconvert, and digitize) a respective received signal to obtain input samples. Each modulator/demodulator 954 through 955 may further process the input samples (e.g., for OFDM, etc.) to obtain received symbols. A MIMO detector 956 may obtain received symbols from the modulator/demodulators 954 and 955, perform MIMO detection on the received symbols, if applicable, and provide detected symbols. A receive (Rx) processor 958 may process (e.g., demodulate, deinterleave, and decode) the detected symbols, providing decoded data for the UE 104-*b* to a data output, and provide decoded control information to a processor 980, or memory 982.

At the UE 104-*b*, a transmit processor 964 may receive and process data from a data source. The transmit processor 964 may also generate reference symbols for a reference signal. The symbols from the transmit processor 964 may be precoded by a transmit MIMO processor 966 if applicable, further processed by the modulator/demodulators 954 and 955 (e.g., for SC-FDMA, etc.), and be transmitted to the UE 104-*a* in accordance with the communication parameters received from the UE 104-*a*. At the UE 104-*a*, the signals from the UE 104-*b* may be received by the antennas 934 and 935, processed by the modulator/demodulators 932 and 933, detected by a MIMO detector 936 if applicable, and further processed by a receive processor 938. The receive processor 938 may provide decoded data to a data output and to the processor 940 or memory 942.

The processor 940 and/or 980 may in some cases execute stored instructions to instantiate a UE communicating component 342 (see e.g., FIGS. 1 and 3).

The components of the UEs 104-*a*, 104-*b* may, individually or collectively, be implemented with one or more ASICs adapted to perform some or all of the applicable functions in hardware. Each of the noted modules may be a means for performing one or more functions related to operation of the MIMO communication system 900. Similarly, the components of the UE 104-*a* may, individually or collectively, be implemented with one or more ASICs adapted to perform some or all of the applicable functions in hardware. Each of the noted components may be a means for performing one or more functions related to operation of the MIMO communication system 900.

The following aspects are illustrative only and aspects thereof may be combined with aspects of other embodiments or teaching described herein, without limitation.

Aspect 1 a method for wireless communication at a first UE capable of full-duplex communication on a sidelink including receiving a sidelink resource reservation for receiving, at the first UE, a first sidelink transmission from a second UE, selecting a first set of resources for transmitting a second sidelink transmission to a third UE, and reselecting, based on a self-interference metric corresponding to the first sidelink transmission received from the second UE, from the first set of resources to a second set of resources for transmitting the second sidelink transmission to the third UE.

In Aspect 2, the method of Aspect 1 includes measuring the self-interference metric based on one or more of performing or predicting a signal measurement associated with one or more of the first sidelink transmission or the second sidelink transmission, where the signal measurement is based on one or more of a dedicated RS or ongoing traffic.

In Aspect 3, the method of Aspect 2 includes where the signal measurement includes one or more of a RSRP, RSSI, ROT, BLER, SINR, SINR or BLER degradation due to the self-interference, or RSSI or ROT increase caused by the self-interference.

In Aspect 4, the method of any of Aspects 1 to 3 includes where reselecting to the second set of resources is based on detecting expiration of a validity of the self-interference metric.

In Aspect 5, the method of any of Aspects 1 to 4 includes computing multiple self-interference metrics corresponding to multiple sets of resources, for transmitting the second sidelink transmission, and the first sidelink transmission received from the second UE, where reselecting to the second set of resources is based on determining that the self-interference metric associated with the second set of resources achieves a threshold.

In Aspect 6, the method of any of Aspects 1 to 5 includes where reselecting to the second set of resources is based on a rule regarding resource units that at least partially overlap the sidelink resource reservation in time or frequency, or at least partially overlap a guard time or frequency for the sidelink resource reservation.

In Aspect 7, the method of any of Aspects 1 to 6 includes where reselecting to the second set of resources is based on comparing a the self-interference metric to a threshold, where the second set of resources at least partially overlap the sidelink resource reservation in time or frequency, or at least partially overlap a guard time or frequency for the sidelink resource reservation.

In Aspect 8, the method of Aspect 7 includes where reselecting to the second set of resources is according to a CR, and includes excluding, from the CR, or partially counting in the CR, at least resources that at least partially overlap the sidelink resource reservation in time or frequency, or at least partially overlap a guard time or frequency for the sidelink resource reservation.

In Aspect 9, the method of Aspect 8 includes where reselecting to the second set of resources also includes excluding, from the CR, or partially counting in the CR, at least resources for transmitting the first sidelink transmission to another UE that at least partially overlap resources for a third sidelink transmission by the another UE, or at least partially overlap a guard time or frequency for the resources for the third sidelink transmission.

In Aspect 10, the method of Aspect 9 includes receiving, from the another UE, an indication of sidelink transmission resources used for the third sidelink transmission.

In Aspect 11, the method of any of Aspects 9 or 10 includes receiving an indication that the another UE is capable to receive communications overlapping in time or frequency with sidelink transmission resources, where the second set of resources include resources that at least partially overlap the resources for the third sidelink transmission by the another UE, or at least partially overlap a guard time or frequency for the resources for the third sidelink transmission, based on the indication.

In Aspect 12, the method of Aspect 7 includes where reselecting to the second set of resources is according to a CBR, and includes excluding, from the CBR, or partially counting in the CBR, at least resources that at least partially overlap the sidelink resource reservation in time or frequency, or at least partially overlap a guard time or frequency for the sidelink resource reservation.

In Aspect 13, the method of Aspect 12 includes where reselecting to the second set of resources also includes excluding, from the CBR, or partially counting in the CBR, at least resources for transmitting the first sidelink transmission to another UE that at least partially overlap resources for a third sidelink transmission by the another UE, or at least partially overlap a guard time or frequency for the resources for the third sidelink transmission.

In Aspect 14, the method of Aspect 13 includes receiving, from the another UE, an indication of sidelink transmission resources used for the third sidelink transmission.

In Aspect 15, the method of any of Aspects 13 or 14 includes receiving an indication that the another UE is capable to receive communications overlapping in time or frequency with sidelink transmission resources, where the second set of resources include resources that at least partially overlap the resources for the third sidelink transmission by the another UE, or at least partially overlap a guard time or frequency for the resources for the third sidelink transmission, based on the indication.

In Aspect 16, the method of any of Aspects 1 to 15 includes where the self-interference metric is associated with one of multiple transmit beams configured for a transmitter and one of multiple receive beams configured for a receiver, and where reselecting to the second set of resources is for the one of multiple transmit beams and the one of multiple receive beams.

Aspect 17 is a method for wireless communication at a UE including computing a CBR for a set of resources over which to transmit first sidelink communications, selecting, according to a CR that is based on the CBR, one or more subchannels in an available portion of the set of resources for transmitting the first sidelink communications, where computing the CBR or selecting the one or more subchannels according to the CR includes excluding or partially counting at least one of the one or more subchannels, where the at least one of the one or more subchannels at least one of: partially overlap a portion of the set of resources associated with receiving second sidelink communications from another UE; or are for transmitting the first sidelink communications to another UE and partially overlap resources associated with the another UE transmitting third sidelink communications, and transmitting the second sidelink communications using the one or more subchannels.

In Aspect 18, the method of Aspect 17 includes where the set of resources associated with receiving the second sidelink communications include resources for receiving the second sidelink communications and a guard time or frequency around the resources for receiving the second sidelink communications.

In Aspect 19, the method of any of Aspects 17 or 18 includes receiving, from the another UE, an indication of sidelink transmission resources used for transmitting the third sidelink communications.

In Aspect 20, the method of any of Aspects 17 to 19 includes receiving an indication that the another UE is capable to receive communications overlapping in time or frequency with sidelink transmission resources, where the one or more subchannels include resources that at least partially overlap the resources for transmitting the third sidelink communications by the another UE, or at least partially overlap a guard time or frequency for the resources for transmitting the third sidelink communications, based on the indication.

Aspect 21 is a method for wireless communication at a UE including computing a CBR for a set of resources over which to transmit first sidelink communications, where computing the CBR includes excluding from the CBR, or partially counting in the CBR, one or more subchannels that at least one of: partially overlap a portion of the set of resources associated with receiving second sidelink communications from another UE; or are for transmitting the first sidelink communications to another UE and partially overlap resources associated with the another UE transmitting third sidelink communications, selecting, according to a CR that is based on the CBR, at least one of the one or more subchannels in an available portion of the set of resources for transmitting the first sidelink communications, and transmitting the second sidelink communications using the at least one of the one or more subchannels.

In Aspect 22, the method of Aspect 21 includes where selecting the at least one of the one or more subchannels includes excluding, from the CR, or partially counting in the CR, the one or more subchannels.

In Aspect 23, the method of any of Aspects 21 or 22 includes where the set of resources associated with receiving the second sidelink communications include resources for receiving the second sidelink communications and a guard time or frequency around the resources for receiving the second sidelink communications.

In Aspect 24, the method of any of Aspects 21 to 23 includes receiving, from the another UE, an indication of sidelink transmission resources used for transmitting the third sidelink communications.

In Aspect 25, the method of any of Aspects 21 to 24 includes receiving an indication that the another UE is capable to receive communications overlapping in time or frequency with sidelink transmission resources, where the one or more subchannels include resources that at least partially overlap the resources for transmitting the third sidelink communications by the another UE, or at least partially overlap a guard time or frequency for the resources for transmitting the third sidelink communications, based on the indication.

Aspect 26 is a method for wireless communication at a UE including excluding or partially counting, in a count of subchannels associated with transmitting first sidelink communications, one or more subchannels of multiple subchannels, where the one or more subchannels at least one of: partially overlap a portion of a set of resources associated with receiving second sidelink communications from another UE; or correspond to transmitting the first sidelink communications to another UE and partially overlap resources associated with the another UE transmitting third sidelink communications, and transmitting the first sidelink communications based on the count of subchannels.

In Aspect 27, the method of Aspect 26, includes computing a CBR for a set of resources over which to transmit the first sidelink communications, where the count of subchannels corresponds to computing a CR based on the CBR, and selecting, according to the CR, a portion of the multiple subchannels in an available portion of the set of resources for transmitting the first sidelink communications, where transmitting the first sidelink communications is over the portion of the multiple subchannels.

In Aspect 28, the method of Aspect 26 includes where the count of subchannels corresponds to a CBR for a set of resources over which to transmit the first sidelink communications, and selecting, according to a CR that is based on the CBR, a portion of the multiple subchannels in an available portion of the set of resources for transmitting the first sidelink communications, where transmitting the first sidelink communications is over the portion of the multiple subchannels.

In Aspect 29, the method of any of Aspects 26 to 28 includes where the set of resources associated with receiving the second sidelink communications include resources for receiving the second sidelink communications and a guard time or frequency around the resources for receiving the second sidelink communications.

In Aspect 30, the method of any of Aspects 26 to 29 includes receiving, from the another UE, an indication of sidelink transmission resources used for transmitting the third sidelink communications.

In Aspect 31, the method of any of Aspects 26 to 30 includes receiving an indication that the another UE is capable to receive communications overlapping in time or frequency with sidelink transmission resources, where the one or more subchannels include resources that at least partially overlap the resources for transmitting the third sidelink communications by the another UE, or at least partially overlap a guard time or frequency for the resources for transmitting the third sidelink communications, based on the indication.

Aspect 32 is an apparatus for wireless communication including a processor, memory coupled with the processor, and instructions stored in the memory and operable, when executed by the processor, to cause the apparatus to perform any of the methods of Aspects 1 to 31.

Aspect 33 is an apparatus for wireless communication including means for performing any of the methods of Aspects 1 to 31.

Aspect 34 is a computer-readable medium including code executable by one or more processors for wireless communications, the code including code for performing any of the methods of Aspects 1 to 31.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus capable of full-duplex communication on a sidelink at a first user equipment (UE), comprising:
   a transceiver;
   a memory configured to store instructions; and
   one or more processors communicatively coupled with the memory and the transceiver, wherein the one or more processors are configured to execute the instructions to cause the apparatus to:
      receive a sidelink resource reservation indicating resources for receiving, at the apparatus, a first sidelink transmission from a second UE;
      select a first set of resources for transmitting a second sidelink transmission to a third UE; and
      reselect, based on a self-interference metric corresponding to the first sidelink transmission received from the second UE, from the first set of resources to a second set of resources for transmitting the second sidelink transmission to the third UE.

2. The apparatus of claim 1, wherein the one or more processors are configured to execute the instructions to cause the apparatus to measure the self-interference metric based on one or more of performing or predicting a signal measurement associated with one or more of the first sidelink transmission or the second sidelink transmission, wherein the signal measurement is based on one or more of a dedicated reference signal (RS) or ongoing traffic.

3. The apparatus of claim 2, wherein the signal measurement includes one or more of a reference signal received power (RSRP), received signal strength indicator (RSSI), rise over thermal (ROT), block error rate (BLER), signal-to-interference-and-noise ratio (SINR), SINR or BLER degradation due to the self-interference, or RSSI or ROT increase caused by the self-interference.

4. The apparatus of claim 1, wherein the one or more processors are configured to execute the instructions to cause the apparatus to reselect to the second set of resources based on detecting expiration of a validity of the self-interference metric.

5. The apparatus of claim 1, wherein the one or more processors are configured to execute the instructions to cause the apparatus to compute multiple self-interference metrics corresponding to multiple sets of resources, for transmitting the second sidelink transmission, and the first sidelink transmission received from the second UE, wherein the one or more processors are configured to execute the instructions to cause the apparatus to reselect to the second set of resources based on determining that the self-interference metric associated with the second set of resources achieves a threshold.

6. The apparatus of claim 1, wherein the one or more processors are configured to execute the instructions to cause the apparatus to reselect to the second set of resources based on a rule regarding resource units that at least partially overlap the sidelink resource reservation in time or frequency, or at least partially overlap a guard time or frequency for the sidelink resource reservation.

7. The apparatus of claim 1, wherein the one or more processors are configured to execute the instructions to cause the apparatus to reselect to the second set of resources based on comparing the self-interference metric to a threshold, wherein the second set of resources at least partially overlap the sidelink resource reservation in time or frequency, or at least partially overlap a guard time or frequency for the sidelink resource reservation.

8. The apparatus of claim 7, wherein the one or more processors are configured to execute the instructions to cause the apparatus to reselect to the second set of resources according to a channel occupancy ratio (CR), and at least in part by excluding, from the CR, or partially counting in the CR, at least resources that at least partially overlap the sidelink resource reservation in time or frequency, or at least partially overlap a guard time or frequency for the sidelink resource reservation.

9. The apparatus of claim 8, wherein the one or more processors are configured to execute the instructions to cause the apparatus to reselect to the second set of resources at least in part by excluding, from the CR, or partially counting in the CR, at least resources for transmitting the first sidelink transmission to another UE that at least partially overlap resources for a third sidelink transmission by the another UE, or at least partially overlap a guard time or frequency for the resources for the third sidelink transmission.

10. The apparatus of claim 9, wherein the one or more processors are configured to execute the instructions to cause the apparatus to receive, from the another UE, an indication of sidelink transmission resources used for the third sidelink transmission.

11. The apparatus of claim 9, wherein the one or more processors are configured to execute the instructions to cause the apparatus to receive an indication that the another UE is capable to receive communications overlapping in time or frequency with sidelink transmission resources, wherein the second set of resources include resources that at least partially overlap the resources for the third sidelink transmission by the another UE, or at least partially overlap a guard time or frequency for the resources for the third sidelink transmission, based on the indication.

12. The apparatus of claim 7, wherein the one or more processors are configured to execute the instructions to cause the apparatus to reselect to the second set of resources according to a channel busy ratio (CBR), and at least in part by excluding, from the CBR, or partially counting in the CBR, at least resources that at least partially overlap the sidelink resource reservation in time or frequency, or at least partially overlap a guard time or frequency for the sidelink resource reservation.

13. The apparatus of claim 12, wherein the one or more processors are configured to execute the instructions to cause the apparatus to reselect to the second set of resources at least in part by excluding, from the CBR, or partially counting in the CBR, at least resources for transmitting the first sidelink transmission to another UE that at least partially overlap resources for a third sidelink transmission by the another UE, or at least partially overlap a guard time or frequency for the resources for the third sidelink transmission.

14. The apparatus of claim 13, wherein the one or more processors are configured to execute the instructions to cause the apparatus to receive, from the another UE, an indication of sidelink transmission resources used for the third sidelink transmission.

15. The apparatus of claim 13, wherein the one or more processors are configured to execute the instructions to cause the apparatus to receive an indication that the another UE is capable to receive communications overlapping in time or frequency with sidelink transmission resources, wherein the second set of resources include resources that at least partially overlap the resources for the third sidelink transmission by the another UE, or at least partially overlap a guard time or frequency for the resources for the third sidelink transmission, based on the indication.

16. The apparatus of claim 1, wherein the self-interference metric is associated with one of multiple transmit beams configured for a transmitter and one of multiple receive beams configured for a receiver, and wherein the one or more processors are configured to execute the instructions to cause the apparatus to reselect to the second set of resources for the one of multiple transmit beams and the one of multiple receive beams.

17. A method for wireless communication at a first user equipment (UE) capable of full-duplex communication on a sidelink, comprising:

receiving a sidelink resource reservation indicating resources for receiving, at the first UE, a first sidelink transmission from a second UE;

selecting a first set of resources for transmitting a second sidelink transmission to a third UE; and reselecting, based on a self-interference metric corresponding to the first sidelink transmission received from the second UE, from the first set of resources to a second set of resources for transmitting the second sidelink transmission to the third UE.

18. The method of claim 17, further comprising measuring the self-interference metric based on one or more of performing or predicting a signal measurement associated with one or more of the first sidelink transmission or the second sidelink transmission, wherein the signal measurement is based on one or more of a dedicated reference signal (RS) or ongoing traffic.

19. The method of claim 18, wherein the signal measurement includes one or more of a reference signal received power (RSRP), received signal strength indicator (RSSI), rise over thermal (RoT), block error rate (BLER), signal-to-interference-and-noise ratio (SINR), SINR or BLER degradation due to the self-interference, or RSSI or ROT increase caused by the self-interference.

20. The method of claim 17, wherein reselecting to the second set of resources is based on detecting expiration of a validity of the self-interference metric.

21. The method of claim 17, further comprising computing multiple self-interference metrics corresponding to multiple sets of resources, for transmitting the second sidelink transmission, and the first sidelink transmission received from the second UE, wherein reselecting to the second set of resources is based on determining that the self-interference metric associated with the second set of resources achieves a threshold.

* * * * *